(12) United States Patent
Gerbe et al.

(10) Patent No.: US 11,691,764 B2
(45) Date of Patent: Jul. 4, 2023

(54) SYSTEM FOR PLACING A SATELLITE IN WORKING ORBIT

(71) Applicant: ARIANEGROUP SAS, Paris (FR)

(72) Inventors: Laurent Gerbe, Pessac (FR); Nicolas Rumeau, Saint Medard en Jalles (FR); Emile Ayel, Bordeaux (FR); David Levinger, Bordeaux (FR)

(73) Assignee: ARIANEGROUP SAS, Paris (FR)

( * ) Notice: Subject to any disclaimer, the term of this patent is extended or adjusted under 35 U.S.C. 154(b) by 390 days.

(21) Appl. No.: 16/965,268

(22) PCT Filed: Mar. 15, 2019

(86) PCT No.: PCT/FR2019/050587
§ 371 (c)(1),
(2) Date: Jul. 27, 2020

(87) PCT Pub. No.: WO2019/175515
PCT Pub. Date: Sep. 19, 2019

(65) Prior Publication Data
US 2021/0070476 A1 Mar. 11, 2021

(30) Foreign Application Priority Data
Mar. 16, 2018 (FR) ...................... 1852266

(51) Int. Cl.
*B64G 1/00* (2006.01)
*B64G 1/40* (2006.01)
*B64G 1/64* (2006.01)

(52) U.S. Cl.
CPC .............. *B64G 1/007* (2013.01); *B64G 1/401* (2013.01); *B64G 1/403* (2013.01); *B64G 2001/643* (2013.01)

(58) Field of Classification Search
CPC .... B64G 1/1078; B64G 1/646; B64G 1/1085; B64G 1/242; B64G 1/007; B64G 2001/643
See application file for complete search history.

(56) References Cited

U.S. PATENT DOCUMENTS

| | | | | |
|---|---|---|---|---|
| 5,052,640 A | * | 10/1991 | Chang | B64G 1/002 244/172.7 |
| 6,543,723 B1 | * | 4/2003 | Oh | B64G 1/007 244/171.5 |

(Continued)

FOREIGN PATENT DOCUMENTS

| | | |
|---|---|---|
| EP | 0772441 A1 | 5/1997 |
| FR | 2980177 A1 | 3/2013 |
| WO | WO 2016/168484 | 10/2016 |

OTHER PUBLICATIONS

Powers, J. W., et al., "Solid Rocket Motors Aim for Deep Space", *Aerospace America, American Institute of Aeronautics & Astronautics*, New York, US, vol. 28, No. 7, pp. 48-51, 89 (Jul. 1, 1990).

(Continued)

*Primary Examiner* — Justin M Benedik
(74) *Attorney, Agent, or Firm* — Bookoff McAndrews, PLLC

(57) ABSTRACT

A system for positioning at least one satellite in working orbit, characterized in that the system for positioning satellites in working orbit comprises: a first attachment device configured to attach a first satellite to the system for positioning satellites in working orbit; a main propulsion device with solid propulsion comprising a plurality of parallel solid-propellant cartridges; a secondary propulsion device which is re-ignitable; at least one position sensor configured to measure the position of said system; a monitoring unit connected to said at least one position sensor and which is configured to control a firing of the cartridges of the main (Continued)

propulsion device to move said system from a transfer orbit to a working orbit of the first satellite, said monitoring unit being further configured to control an opening of the first attachment device to separate said system from the first satellite.

15 Claims, 5 Drawing Sheets

(56) References Cited

U.S. PATENT DOCUMENTS

| | | | |
|---|---|---|---|
| 7,254,936 B1 | 8/2007 | Knight | |
| 7,578,482 B2* | 8/2009 | Duden | B64G 1/641 |
| | | | 428/305.5 |
| 2018/0037340 A1 | 2/2018 | Nelson et al. | |
| 2021/0061494 A1* | 3/2021 | Belieres Montero | B64G 4/00 |
| 2021/0070476 A1* | 3/2021 | Gerbe | B64G 1/007 |
| 2021/0122502 A1* | 4/2021 | Kokorich | B64G 1/645 |

OTHER PUBLICATIONS

French Search Report in FR1852266, dated Jan. 25, 2019 (3 pages).
International Search Report in PCT/FR2019/050587, dated Jun. 24, 2019 (3 pages).

* cited by examiner

SYSTEM FOR PLACING A SATELLITE IN WORKING ORBIT

CROSS-REFERENCE TO RELATED APPLICATIONS

This patent application is the U.S. National Phase Entry Under 35 U.S.C. § 371 of International Application No. PCT/FR2019/050587, filed on Mar. 15, 2019, which claims the benefit of priority to French Patent Application No. 1852266, filed on Mar. 16, 2018.

BACKGROUND OF THE INVENTION

The present invention relates to the general field of systems for positioning artificial satellites in orbit.

Generally, the satellites are positioned in orbit around the earth by a staged launcher which comprises lower stages, an upper stage and a nose cone which is attached to the upper stage and in which the satellite is installed.

The lower stages, which in particular comprise the acceleration stages (also called "boosters") and the main stage, are used in the first part of the flight, the ten first minutes, and are used to provide most of the thrust to the launcher in order to place in space the upper stage of the launcher on which the satellite to be positioned in orbit is installed.

The role of the upper stage of the launcher, once said upper stage is separated from the lower stages, is to place the satellite in its transfer orbit. The known upper stages have a liquid propulsion system.

Once the satellite is positioned in orbit around the earth on its transfer orbit, the satellite uses its own propulsion system, the apogee motor, in order to be placed in its final orbit, called working orbit. The apogee motor is generally a liquid or electric propulsion system, which has the advantage of being re-ignitable, thus facilitating the monitoring of the positioning of the satellite in working orbit.

However, this current solution has several drawbacks. Indeed, the passage for the satellite from its transfer orbit to its working orbit can take a relatively long time during which the satellite cannot be used by its operator. For example, the duration for placing a satellite from its transfer orbit to a geostationary orbit can take about ten days when the satellite has a liquid propulsion apogee motor, and one month or even more when the satellite comprises an electric propulsion apogee motor.

The solid propulsion apogee motors are also known, which are made by a solid-propellant cartridge whose profile is machined according to the parameters of the transfer between the transfer orbit and the working orbit of the satellite. However, such a solution is complex and costly because, on the one hand, the machining of the propellant is a dangerous operation and, on the other hand, the machining to be carried out is unique for each satellite.

In addition, the current apogee motors have significant mass and overall dimension, thereby reducing the working equipment that can be carried on the satellites. The mass and the overall dimension of the apogee motor is even more problematic when the launcher carries several satellites, the mass and the overall dimension of the apogee motors of each satellite cumulating.

OBJECT AND SUMMARY OF THE INVENTION

The present invention therefore aims mainly at overcoming such drawbacks by proposing a system for positioning at least one satellite in orbit making it possible to carry out the orbit transfer between the transfer orbit and the working orbit of said at least one satellite.

The present invention aims in particular at replacing the apogee motor of the satellite, which allows saving mass and space to equip the satellite with more working equipment, and particularly for a launch carrying several satellites.

According to a first aspect, the invention proposes a system for positioning at least one satellite in working orbit, characterized in that the system for positioning satellites in working orbit comprises:
- a first attachment device configured to attach a first satellite to the system for positioning satellites in working orbit;
- a main propulsion device with solid propulsion comprising a plurality of parallel solid-propellant cartridges;
- a secondary propulsion device which is re-ignitable;
- at least one position sensor configured to measure the position of said system;
- a monitoring unit connected to said at least one position sensor and which is configured to control a firing of the cartridges of the main propulsion device to move said system from a transfer orbit to a working orbit of the first satellite, said monitoring unit being further configured to control an opening of the first attachment device to separate said system from the first satellite, and said monitoring unit being configured to control an ignition of the secondary propulsion device to monitor an orientation of said system.

The system can also comprise the following characteristics, which can be taken alone or in combination depending on the technical possibilities:
- the monitoring unit is configured to control a sequential ignition of the plurality of cartridges of the main propulsion device;
- the system comprises a second attachment device configured to attach a second satellite to said system, the monitoring unit being configured to control an opening of the second attachment device to separate the second satellite from said system;
- the second attachment device is configured to attach the second satellite directly to the first satellite, the monitoring unit being configured to control an opening of the second attachment device to separate the second satellite from said first satellite;
- the second attachment device is configured to attach the second satellite directly to said main propulsion device, the monitoring unit being configured to control an opening of the second attachment device to separate the second satellite from said system;
- the solid-propellant cartridges are formed by a cellular structure comprising cells filled with solid propellant;
- the cellular structure is a honeycomb structure;
- the cellular structure is made of metal or of composite material;
- the cellular structure is made of aluminum alloy;
- an inner surface of the cells is covered by a thermal protection layer;
- the secondary propulsion device is a compressed-gas propulsion device;
- the solid-propellant cartridges each comprise an added bottom comprising a chamfered drilling;
- the solid-propellant cartridges each comprise a thrust range comprised between 200 DaN and 240 DaN;
- the system comprises a battery which is connected to the monitoring unit.

According to a second aspect, the invention proposes an assembly comprising a system according to any one of the preceding characteristics and a first satellite attached to said system by the first attachment device.

The assembly may also comprise a second satellite which is attached to the system by the second attachment device.

According to a third aspect, the invention proposes a method for controlling the system according to any one of the preceding characteristics, wherein the method comprises the following steps:

measuring the position of said system by the at least one position sensor;

monitoring the firing of the solid-propellant cartridges of the main propulsion device by the monitoring unit;

monitoring the ignition of the secondary propulsion device by the monitoring unit;

opening the first attachment device when the system is in a determined position corresponding to the working orbit of the first satellite.

The method can also comprise the following step:

opening the second attachment device when the system is in a determined position corresponding to the working orbit of the second satellite.

BRIEF DESCRIPTION OF THE DRAWINGS

Other characteristics and advantages of the present invention will emerge from the description given below, with reference to the appended drawings which illustrate an exemplary embodiment thereof without any limitation. In the figures.

DETAILED DESCRIPTION OF THE INVENTION

Figure 1:
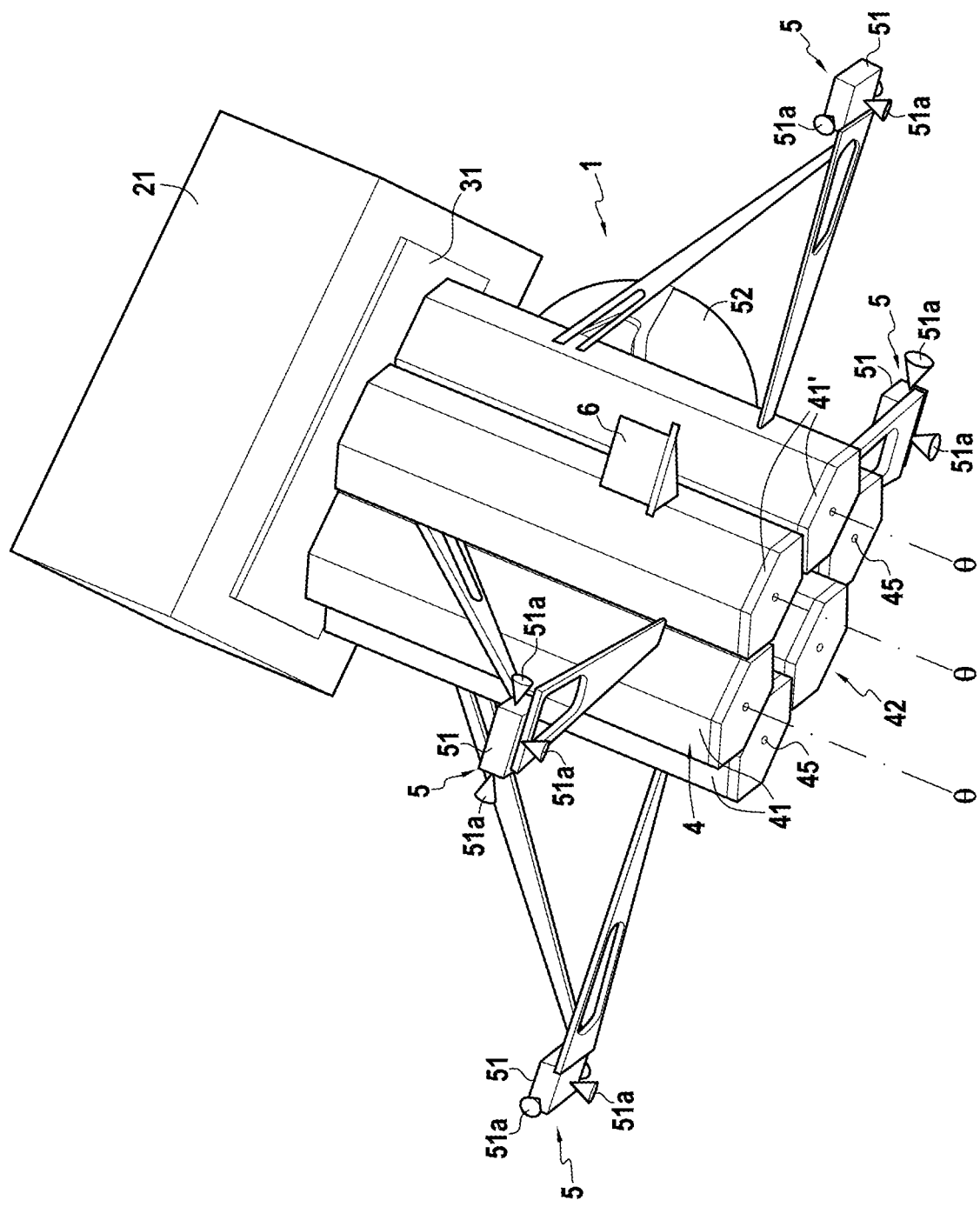
FIG. 1 represents a system for positioning satellites in working orbit according to a possible variant in which a single satellite is installed on said system.
Figure 2:
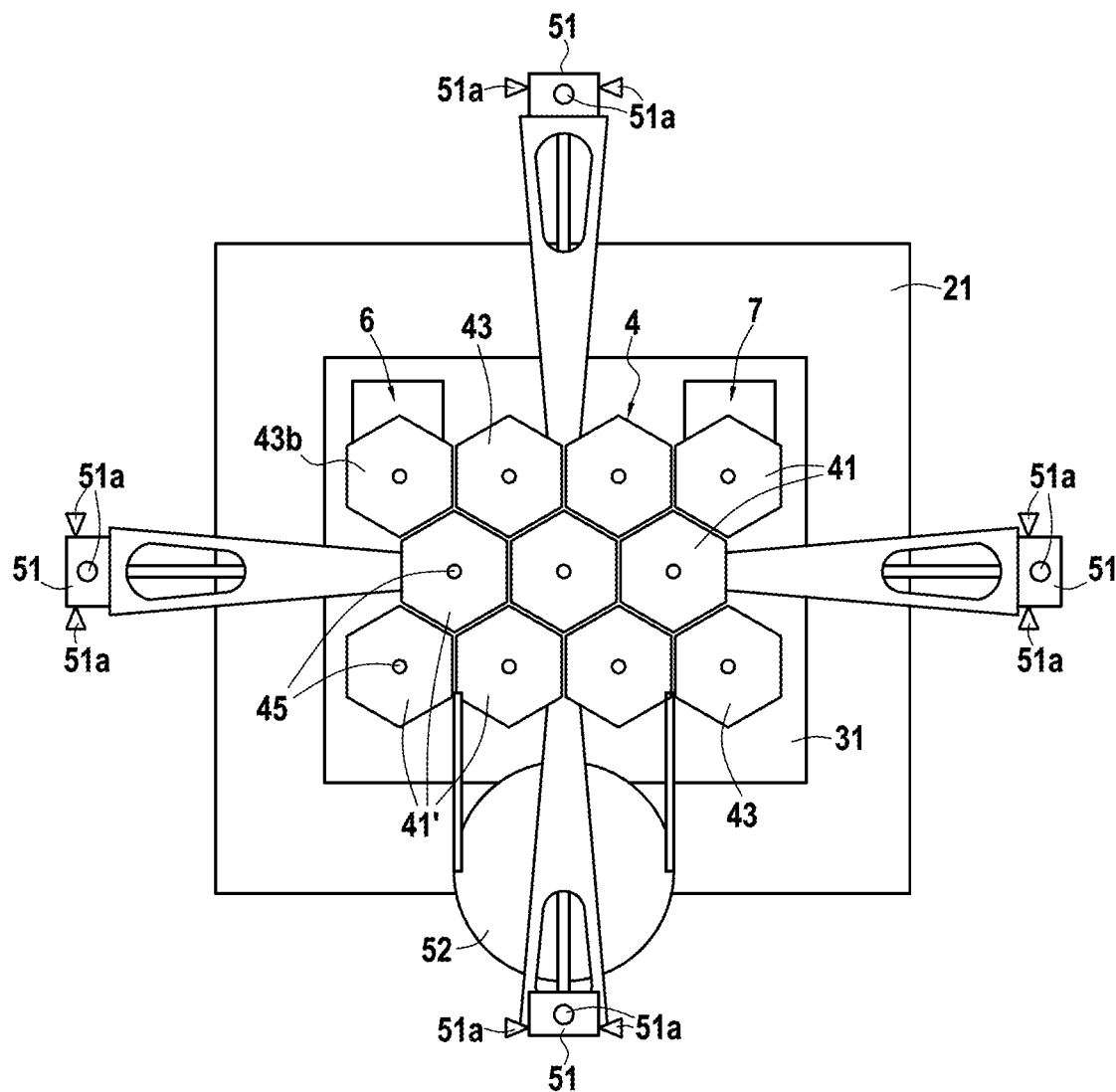
FIG. 2 represents a bottom view of the system represented in FIG. 1.

FIG. 1 and FIG. 2 represent a system 1 for positioning at least one satellite in working orbit, said system 1 being intended to transfer at least one satellite from its transfer orbit to its working orbit.

The system 1 comprises a first attachment device 31 which allows the attachment of a first satellite 21 to the system 1. The first attachment device 31 comprises a closed position in which the first satellite 21 is attached to the system 1, and an open position in which the first satellite 21 is detached from said system 1.

The first attachment device 31 can for example comprise explosive bolts which are fired in order to pass said first attachment device 31 into the open position. The first attachment device 31 can also for example comprise a spring which is compressed when the first attachment device 31 is in the closed position, said spring deploying during the passage into the open position of said first attachment device 31 in order to give an impulse to the first satellite 21 in order to separate said first satellite 21 and the system 1.

The system 1 also comprises a main propulsion device 4 with solid propulsion. The main propulsion device 4 is formed by a plurality of parallel solid-propellant cartridges 41. The cartridges 41 can be filled for example by pouring the propellant inside the cartridges 41, the propellant thus being bonded to the inside of said cartridges 41, or by sliding a propellant block inside the cartridges 41, a clearance thus existing between the propellant block and the inside of the cartridges 41. The propellant can for example be made of BUTALANE® or of BUTALITE®. The propellant can for example comprise vacuum specific impulse ranges (ISP) comprised between 260 and 280 seconds. By parallel cartridges 41 it is understood that the cartridges 41 each comprise a main axis of elongation $\theta$, the main axes of elongation $\theta$ of said cartridges 41 being parallel to each other. The main propulsion device 4 is intended to provide the thrust making it possible to propel the system 1 on which the first satellite 21 is installed from the transfer orbit on which the launcher has placed said system 1 until the working orbit of the first satellite 21.

The main propulsion device 4 comprises a device for firing the cartridges 41 which is configured to allow independent firing of each of the cartridges 41. The firing device thus allows firing several cartridges 41 simultaneously, and firing several cartridges 41 one after the other.

The cartridges 41 of the main propulsion device 4 are sealed by an added bottom 41' which is attached on said cartridges 41 once said cartridges 41 are filled with propellant. The added bottom 41' is preferably made of thermo-structural material (that is to say configured to withstand the high temperatures caused by the combustion of the propellant), for example of carbon/carbon or carbon/phenolic composite.

The added bottom 41' of each of the cartridges 41 comprises a drilling 45 so as to allow the exhaust of gas upon firing of the cartridges 41. The drilling 45 can be formed by a pre-drilling which is intended to break upon firing of the cartridge 41. Preferably, the drilling 45 is chamfered so as to have a conical shape, the drilling 45 thus forming a nozzle for the ejection of the combustion gases of the propellant.

The fact that the main propulsion device 4 is with solid propulsion allows a faster positioning in working orbit compared to liquid or electric propulsion, a solid-propellant propulsion having an energy release rate faster than a liquid-propellant propulsion or an electric propulsion. Furthermore, the fact that the main propulsion device 4 comprises a plurality of parallel cartridges 41 allows modulating the propulsion over time. Such a modulation of the thrust over time is obtained by a monitoring of the sequence of firing of the cartridges 41. The modulation of the thrust added by the main propulsion device 4 allows keeping the same system structure 1 for different launches of satellites.

The cartridges 41 can comprise a unitary thrust range (at +20° C.) comprised between 200 DaN and 240 DaN. Such a thrust range for each cartridge 41 ensures rapid orbit transfer. To do so, the propellant charge of each cartridge 41 is adapted so that the combustion of said propellant charge generates a thrust comprised between 200 DaN and 240 DaN.

The cartridges 41 are structural, that is to say the cartridges 41 take up the mechanical loads created by the thrust generated by the system 1.

Figure 3:
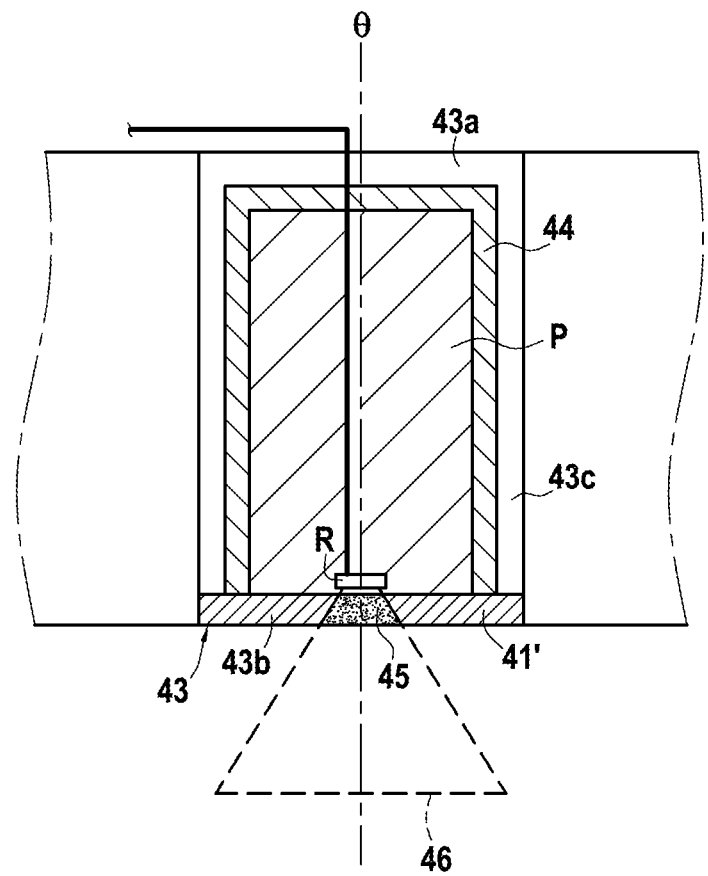
FIG. 3 represents a sectional view of a cell of the main propulsion device.

The main propulsion device 4 can be formed by a cellular network 42, each cell 43 of said cellular network 42 being filled with solid propellant so as to form a cartridge 41. As represented in FIG. 3, the cells 43 comprise a first bottom wall 43a and a second bottom wall 43b located on either side of an internal cavity formed by a side wall 43c, said internal cavity being sealed by the first and second bottom walls 43a and 43b. The added bottom 41' forms the second bottom wall 43b.

Unlike the known solid-propulsion apogee motor solutions that comprise a single solid-propellant cartridge which comprises at least one channel having a complex shape which has been specifically machined according to the orbit transfer to be carried out, the cartridges 41 of the main propulsion system 4 according to the invention comprise a simple structure, they comprise a single propellant block P devoid of internal channel. The combustion of the propellant block is carried out with a combustion front which advances progressively from the added bottom 41' towards the other end of the cartridge 41, like the combustion of a cigarette. The cross section of the propellant block P can comprise, for example, a circular, hexagonal, or even square shape.

The cellular structure 42 is preferably a honeycomb structure in order to ensure good compactness of the main propulsion device 4. However, shapes other than cells 43 with a hexagonal cross section may be possible, such as for example cells 43 with circular cross section or square cross section.

By cross section is understood a section perpendicular to the main axis of elongation θ of said cell 43.

The cells 43 can be made of metal, for example aluminum alloy, and in particular an alloy formed from families of aluminum alloy 2024 and 7010, in order to limit the mass of the cellular network 42. The cells 43 can also be made of composite material, for example a carbon fiber and epoxy matrix composite. The interior of the cells 43 is preferably covered by a thermal protection layer 44, which can be an elastomer, for example a silicone or made of EPDM (ethylene-propylene-diene monomer). When the cellular structure 42 is made of metal, it can be made by three-dimensional printing (also called additive manufacturing). When the cellular structure 42 is made of composite material, the cells 43 may be formed by winding of the fibrous reinforcement around a mandrel, the fibrous reinforcement being possibly pre-impregnated or impregnated after the shaping around the mandrel.

The cellular structure 42 can for example comprise between 5 and 20 cells 43, more specifically between 7 and 16 cells 43, the number of cells 43 can be adapted according to the mass of the satellite(s) to be transported. Furthermore, the cellular structure 42 can be adapted to the mass of the load to be transported by adjusting the number of cells 43 filled with propellant.

The cells 43 may have a height comprised between 1,500 mm and 2,000 mm, in particular 1,700 mm, and a section with a surface comprised between 0.038 $m^2$ and 0.087 $m^2$. Such cells allow bringing speed and acceleration to the system 1 suitable for carrying out the orbit transfer without damaging said first satellite 21 while ensuring a satisfactory speed of movement.

As illustrated in FIG. 3, the firing device can for example comprise a heating resistor R which is in contact with the propellant layer P of the cartridge 41, for example by being buried within the propellant layer P in the vicinity of the added bottom 41'.

The first attachment device 31 can be directly located on the first bottom wall 43a of the cells 43, thus making it possible to reduce the overall dimension of the system 1.

Furthermore, the main propulsion device 4 may comprise a nozzle at the ends of the cartridges 41, thus making it possible to adapt the coefficient of expansion of the gas expelled by said cartridges 41.

As illustrated in FIG. 3, the nozzle can for example be formed by the chamfered drilling 45 of the added base 41'. The drilling 45 can be filled with a sacrificial material which is intended to be destroyed and thus open the drilling 45 upon firing of the cartridge 41. The sacrificial material can for example be made by a pre-drilling. When the nozzle is formed only by the drilling 45, the coefficient of expansion can be comprised between 2 and 3, and is preferably equal to 2.5. In addition, as illustrated in FIG. 3 by the broken lines, an added nozzle 46 can be attached to the end of the cartridge 41, in the continuity of the drilling 45, thus making it possible to obtain a higher coefficient of expansion, for example comprised between 2.5 and 100.

The system 1 also comprises a secondary propulsion device 5 which is re-ignitable and which is intended on the one hand to allow the piloting of the orientation of the system 1 in order to place the first satellite 21 in its working orbit in a monitored manner, and on the other hand to place the system 1 in a garage orbit once the first satellite 21 is placed in its working orbit. By re-ignitable it is understood here that the thrust brought by the secondary propulsion device 5 can be activated and deactivated at will. The secondary propulsion device 5 is attached to the cartridges 41 of the main propulsion device 4.

The secondary propulsion device 5 is configured to transmit a second thrust which is lower than the first thrust transmitted by the main propulsion device 4. The secondary propulsion device 5 can also be configured to give a speed lower than the speed given by the main propulsion device 4, for example a speed comprised between 5 m/s and 20 m/s, more specifically between 10 m/s and 15 m/s, and even more specifically between 10 m/s and 12 m/s. Such a speed ensures accurate positioning of the first satellite 21 in orbit.

The secondary propulsion device 5 can for example comprise a plurality of ejection valves 51 evenly distributed around the system 1, which are connected to a tank 52, and which are configured to eject a fluid stored in said tank 52. Preferably, the ejection valves 51 comprise a plurality of ejection points 51a which are oriented in different directions, in order to allow ejection of the fluid in several possible directions by an ejection valve 51. The reservoir 52 can for example comprise a gas or a liquid stored under pressure. According to another possible variant, the secondary propulsion device 5 can be an electric propulsion device.

The system 1 also comprises at least one position sensor 6 which is configured to measure the position of the system 1. The position of the system 1 comprises on the one hand the orientation of the system 1 and on the other hand the location of said system 1 in space. The at least one position sensor 6 can comprise optical sensors, such as for example a star sensor, an earth sensor or a solar sensor. The at least one position sensor 6 can also comprise an inertial unit.

The system 1 further comprises a monitoring unit 7 which is connected to said at least one position sensor 6 and which is configured to control the first attachment device 31, the main propulsion device 4 and the secondary propulsion device 5 based on the position measured by said at least one position sensor 6.

The monitoring unit 7 is configured to control the sequence of firing of the cartridges 41 of the main propulsion device 4 so that said main propulsion device 4 provides a suitable thrust to move the system 1 from the transfer orbit to the working orbit of the first satellite 21. To do so, the monitoring unit 7 is connected to the device for firing the cartridges 41 of said main propulsion device 4. Preferably, the sequence of firing of the cartridges 41 is monitored by the monitoring unit in order to keep the acceleration of the system 1 comprised between 0.2 and 5 g, and even more preferably between 0.2 g and 1 g, in order to ensure an orbit transfer of a satisfactory duration without damaging the first satellite 21. The speed targeted by the monitoring unit 7 can be comprised between 1,400 m/s and 2,000 m/s.

The monitoring unit 7 is also configured to control the secondary propulsion device 5 in order to give said system 1 the desired orientation. The monitoring of the orientation of the system 1 is made in particular when the system 1 has arrived on the working orbit of the first satellite 21 in order to give said system 1 the desired orientation in order to achieve the separation of the system 1 with the first satellite 21 in order to place said first satellite 21 in its working orbit. The monitoring unit 7 is configured to control the secondary propulsion device 5 in order to move the system 1 into a garage orbit once the first satellite 21 is separated from said system 1.

The monitoring unit 7 can also be configured to give the system 1 on which the first satellite 21 is attached a second speed lower than the first speed by monitoring of the ignition of the secondary propulsion device 5. The monitoring unit 7 can in particular be configured to give a second speed comprised between 5 m/s and 20 m/s, more specifically 10 m/s and 15 m/s, and even more specifically between 10 m/s and 12 m/s. The second speed ensures good positioning of the first satellite 21 in its working orbit.

The monitoring unit 7 is further configured to control the first attachment device 31 in order on the one hand to maintain said first attachment device 31 in its closed position so as to maintain the attachment between the first satellite 21 and the system 1 during the entire launch phase as well as during the transfer between the transfer orbit and the working orbit of said first satellite 21, and on the other hand in order to tilt said first attachment device 31 into its open position to separate the first satellite 21 and the system 1 when said system 1 is located on the working orbit of the first satellite 21 and when said system 1 is oriented in the desired manner.

The monitoring unit 7 comprises a memory, on which a computer program product or computer program is recorded, configured to implement a method for controlling the system 1 for positioning at least one satellite in working orbit as described in the present application. The monitoring unit 7 also comprises a processor for the implementation of said computer program or computer program product, recorded on the memory.

The system 1 is energy independent of the first satellite 21 so as not to waste the energy stored by the first satellite 21 and reduce the duration of use of said first satellite 21. To do so, the system 1 comprises an on-board battery which is connected to the monitoring unit 7 and which supplies the monitoring unit 7 with electricity.

A method for controlling the system 1 for the transfer of the first satellite 21 from its transfer orbit to its working orbit comprises the following steps:
  measuring the position of said system 1 by the at least one position sensor 6, the measurement being transmitted to the monitoring unit 7;
  monitoring the firing of the solid-propellant cartridges 41 of the main propulsion device 4 by the monitoring unit 7, thus making it possible to provide the thrust for the movement between the transfer orbit and the working orbit of the first satellite 21;
  monitoring the ignition of the secondary propulsion device by the monitoring unit, thus making it possible to accurately monitor the position of the system 1;
  opening the first attachment device 31 when the system 1 is in a determined position corresponding to the working orbit of the first satellite 31.

Figure 4:
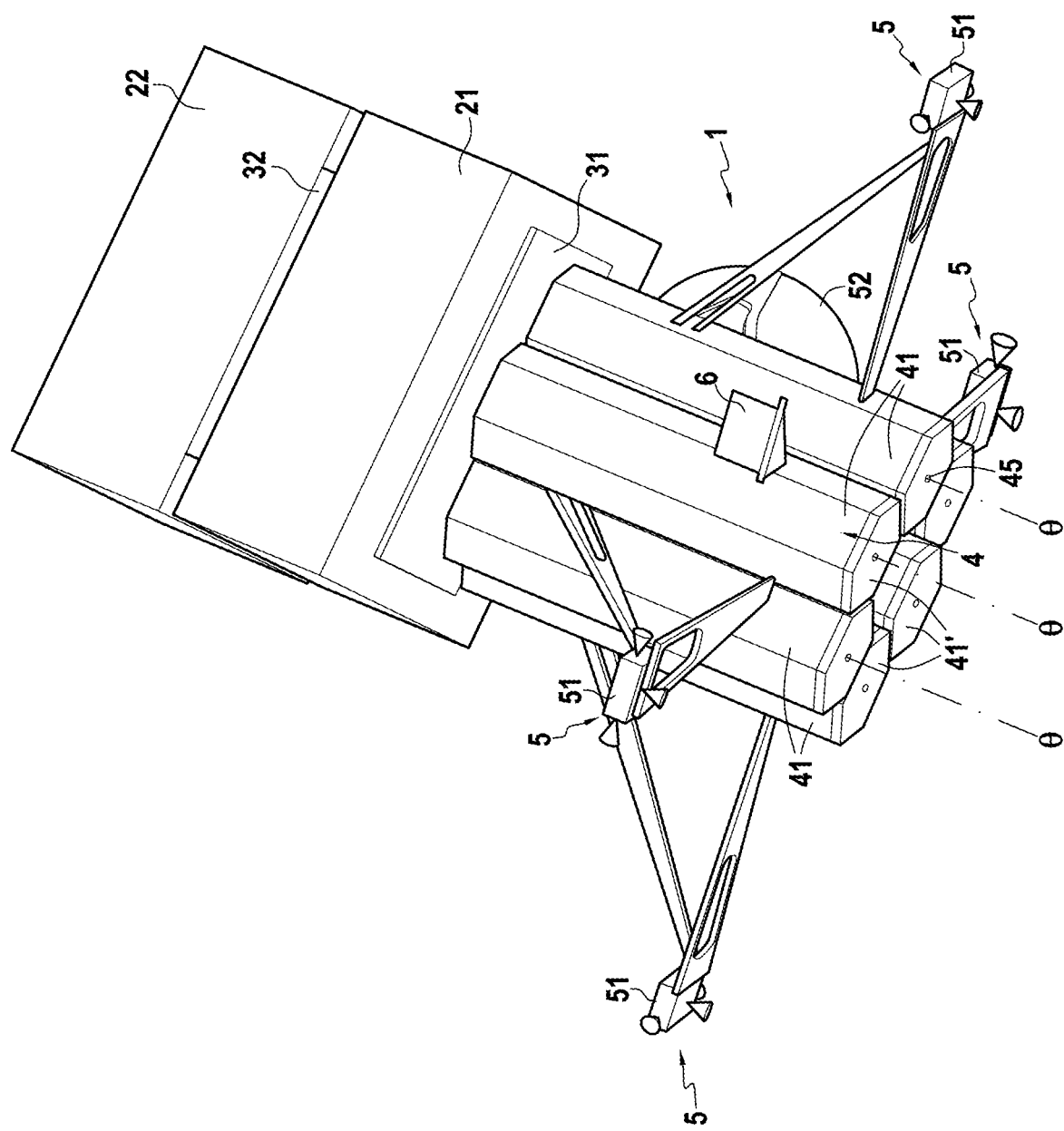
FIG. 4 represents a variant in which two satellites are installed on the system for positioning satellites in working orbit, the satellites being superimposed.
Figure 5:
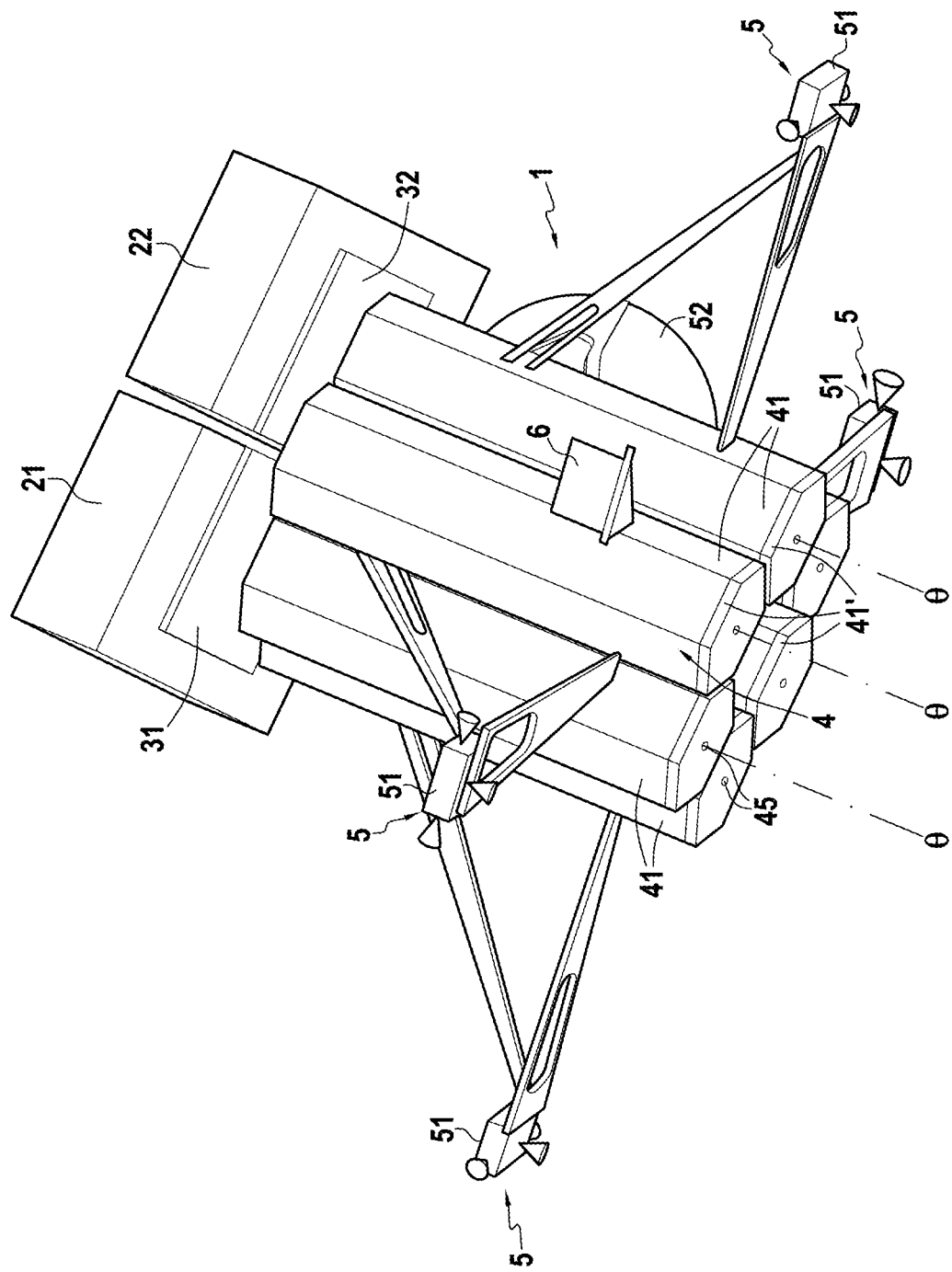
FIG. 5 represents a variant in which two satellites are installed on the system for positioning satellites in working orbit, the satellites being both directly attached to the system.

As illustrated in FIGS. 4 and 5, the system 1 is intended to position several satellites in working orbit. The fact that the system 1 places several satellites in orbit offers the advantage of pooling the equipment for the propulsion of said satellites. Thus, as illustrated in FIG. 4 and FIG. 5, in addition to the first satellite 21, a second satellite 22 is attached to the system 1. Of course, a larger number of satellites can be installed on the system 1. The attachment of the second satellite 22 to the system 1 is made by a second attachment device 32 which is similar to the first attachment device 31. Thus, the second attachment device 32 has a closed position in which said second attachment device 32 maintains the second satellite 22, and an open position in which said second satellite 22 is no longer attached to said system 1. The monitoring unit 7 is connected to the second attachment device 32 and is configured to control the opening of said second attachment device 32, as well as all the other attachment devices when more than two satellites are installed on the system 1.

The device for attaching the satellite(s) 21 and 22 to the system 1 may comprise a plate, the first satellite 21 and/or the second satellite 22 being added onto a first face of said plate, the main propulsion device 4 being attached to the second face of the plate which is opposite to the first face. The plate can for example comprise attachment flanges on which the first satellite 21 and the second satellite 22 are attached by explosive bolts. The fact that the attachment device comprises a plate makes it possible to easily attach several satellites on the system 1, and offers the possibility of attaching the satellites next to each other.

In addition, according to a possible variant, the plate can comprise a mast protruding from the first face of said plate, a plurality of satellites being attached to said mast. The mast is particularly advantageous for positioning a cluster of microsatellites or nanosatellites in station.

The number of cartridges 41 of the main propulsion device 4 can be adapted according to the mass of the satellites to be transported, and therefore in particular according to the number of satellites. Furthermore, the filling of the solid-propellant cartridges 41 can also be adapted according to the mass of the satellites to be transported.

In the variant illustrated in FIG. 4, the second satellite 22 is superimposed on the first satellite 21. Thus, the first attachment device 31 is directly in contact on the one hand with the system 1 and on the other hand with the first satellite 21 in order to attach said first satellite 21 to said system 1, and the second attachment device 32 is directly in contact on the one hand with the first satellite 21 and on the other hand with the second satellite 22 in order to attach said second satellite 22 to said first satellite 21. This variant offers the advantage of reducing the overall width of the system 1 and the satellites in the launcher.

In the variant illustrated in FIG. 4, the second satellite 22 is first placed in its working orbit by the system 1, then the first satellite 21 is placed in its working orbit. Such a variant can for example be used when the second satellite 22 has a working orbit of lower altitude than the first satellite 21, or when the two satellites 21 and 22 have two working orbit of the same altitude.

The monitoring unit 7 controls the main propulsion device 4 in order to provide a thrust for carrying out the transfer between the transfer orbit to which the launcher has placed the system 1 on which the first and second satellites 21 and 22 are installed and the working orbit of the second satellite 22. When the monitoring unit 7 detects with the position sensor(s) 6 that the system 1 has arrived at the working orbit of the second satellite 22, the monitoring unit 7 controls the speed and the orientation of said system 1 with the secondary propulsion device 5 in order to get ready to place the second satellite 22 in its working orbit. When the monitoring unit 7 detects that the position of the system 1 is satisfactory, the monitoring unit 7 controls the opening of the second attachment device 32 and thus separates said second satellite 22 from said system 1 (and from the first satellite 21). Then, if the altitude of the working orbit of the first satellite 21 is greater than the altitude of the working orbit of the second satellite 22, the monitoring unit 7 controls the main propulsion device 4 to provide the thrust that allows making the transfer between the working orbit of the second satellite 22 and the working orbit of the first satellite 21. If the working orbit of the first satellite 21 is at the same altitude as the working orbit of the second satellite 22, the monitoring unit 7 controls the ignition of the secondary propulsion device 5 in order to adapt the position of the system 1. Once the system 1 is at the working orbit of the first satellite 21 and in the desired position, the monitoring unit 7 controls the opening of the first attachment device 31 and thus separates the first satellite 21 from the system 1. Once the system 1 is separated from the first satellite 21, the monitoring unit 7 controls the secondary propulsion device 5 in order to place system 1 in storage orbit.

In the variant illustrated in FIG. 5, the first satellite 21 and the second satellite 22 are located side by side, the satellites 21 and 22 being both directly attached to the system 1. In this variant, the first attachment device 31 is directly located between the first satellite 21 and the system 1, and the second attachment device 32 is directly located between the second satellite 21 and the system 1.

The variant illustrated in FIG. 5 offers the advantage of not requiring that one satellite be positioned in its working orbit before the other. In addition, this variant allows limiting the overall height of the system 1 and the satellites in the launcher. The first satellite 21 and the second satellite 22 can have working orbits at different altitudes or they can have working orbits of the same altitude.

The invention claimed is:

1. A system for positioning at least one satellite in working orbit, wherein the system for positioning satellites in working orbit comprises:
    a first attachment device configured to attach a first satellite to the system for positioning satellites in working orbit;
    a main propulsion device with solid propulsion comprising a plurality of parallel solid-propellant cartridges;
    a secondary propulsion device which is re-ignitable;
    at least one position sensor configured to measure the position of said system;
    a monitoring unit connected to said at least one position sensor and which is configured to control a firing of the cartridges of the main propulsion device to move said system from a transfer orbit to a working orbit of the first satellite, said monitoring unit being further configured to control an opening of the first attachment device to separate said system from the first satellite, and said monitoring unit being configured to control an ignition of the secondary propulsion device to monitor an orientation of said system,
    wherein the monitoring unit is configured to control a sequential ignition of the plurality of cartridges of the main propulsion device.

2. The system according to claim 1, wherein the solid-propellant cartridges each comprise a thrust range comprised between 200 DaN and 240 DaN.

3. The system according to claim 1, wherein the system comprises a second attachment device configured to attach a second satellite to said system, the monitoring unit being configured to control an opening of the second attachment device to separate the second satellite from said system.

4. The system according to claim 3, wherein the second attachment device is configured to attach the second satellite directly to the first satellite, the monitoring unit being configured to control an opening of the second attachment device to separate the second satellite from said first satellite.

5. The system according to claim 3, wherein the second attachment device is configured to attach the second satellite directly to said main propulsion device, the monitoring unit being configured to control an opening of the second attachment device to separate the second satellite from said system.

6. The system according to claim 1, wherein the solid-propellant cartridges are formed by a cellular structure comprising cells filled with solid-propellant.

7. The system according to claim 6, wherein the cellular structure is a honeycomb structure.

8. The system according to claim 6, wherein the cellular structure is made of metal or of composite material.

9. The system according to claim 8, wherein an inner surface of the cells is covered by a thermal protection layer.

10. The system according to claim 1, wherein the secondary propulsion device is a compressed-gas propulsion device.

11. The system according to claim 1, wherein the solid-propellant cartridges each comprise an added bottom comprising a chamfered drilling.

12. An assembly comprising a system according to claim 1, and a first satellite attached to said system by the first attachment device.

13. The assembly according to claim 12, wherein the assembly comprises a second satellite which is attached to the system by the second attachment device.

14. The method for controlling the system according to claim 1, wherein the method comprises the following steps:
    measuring the position of said system by the at least one position sensor;
    monitoring the firing of the solid-propellant cartridges of the main propulsion device by the monitoring unit;
    monitoring the ignition of the secondary propulsion device by the monitoring unit;
    opening the first attachment device when the system is in a determined position corresponding to the working orbit of the first satellite.

15. The method according to claim 14, wherein said method comprises the following step:
    opening the second attachment device when the system is in a determined position corresponding to the working orbit of the second satellite.

* * * * *